United States Patent [19]

Okumura et al.

[11] Patent Number: 6,034,183
[45] Date of Patent: Mar. 7, 2000

[54] POLYMER HAVING QUATERNARY AMMONIUM GROUPS AND PROCESS FOR THE PRODUCTION THEREOF

[75] Inventors: Tatsuya Okumura; Jiro Mizuya; Junji Shiigi, all of Tsukuba, Japan

[73] Assignee: Arakawa Chemical Industries, Ltd., Osaka-Fu, Japan

[21] Appl. No.: 09/093,057

[22] Filed: Jun. 8, 1998

[30] Foreign Application Priority Data

Jun. 9, 1997 [JP] Japan ................................ 9-168139
Feb. 20, 1998 [JP] Japan ................................ 10-056033

[51] Int. Cl.⁷ .................................................. C08F 18/22
[52] U.S. Cl. ........................... 525/293; 526/259; 526/262; 526/292.2; 526/310
[58] Field of Search ............................ 525/293; 526/310, 526/259, 262, 292.2

[56] References Cited

U.S. PATENT DOCUMENTS 4,009,201   2/1977   Steckler et al. ........................ 526/260

FOREIGN PATENT DOCUMENTS 56-135501   10/1981   Japan.
57-158208   9/1982   Japan.

*Primary Examiner*—James J. Seidleck
*Assistant Examiner*—Olga Asinovsky
*Attorney, Agent, or Firm*—Sughrue, Mion, Zinn Macpeak & Seas, PLLC

[57] ABSTRACT

A process for preparing polymers having quaternary ammonium groups comprising polymerizing a vinyl monomer component containing a vinyl monomer having a tertiary amino group in the presence of a specific solvent, while quaternizing the tertiary amino group with a quaternizing agent, to produce the vinyl polymers having quaternary ammonium groups in the form of particles dispersed in the solvent, which is possible to easily separate the produced polymers having quaternary ammonium groups from the solvent without requiring a heating step for removing the solvent, and which can produce quaternary ammonium group-containing copolymers having a high content of a hydrophobic vinyl monomer. The quaternary ammonium group-containing copolymers obtained by this process are useful as modifier for plastics, permanent antistatic agent, bactericide or fungicide, chemicals for paper making and water treating agent.

17 Claims, No Drawings

POLYMER HAVING QUATERNARY AMMONIUM GROUPS AND PROCESS FOR THE PRODUCTION THEREOF

BACKGROUND OF THE INVENTION

The present invention relates to a polymer having quaternary ammonium groups and a process for the production thereof. The quaternary ammonium group-containing polymer obtained according to the present invention can be utilized as permanent antistatic agents or modifiers for plastics, bactericides or fungicides, chemicals for paper making, water treating agents and the like, and is particularly useful as permanent antistatic agents or modifiers for thermoplastic resins such as polystyrene, styrene-acrylonitrile copolymer, ABS resin and polyvinyl chloride.

Quaternary ammonium group-containing polymers have hitherto been prepared by solution polymerization of monomers having a quaternary ammonium group in a suitable solvent, as disclosed in Japanese Patent Publication Kokoku No. 49-16033 and Japanese Patent Publication Kokai No. 63-54466. In many cases, the quaternary ammonium group-containing polymers are generally required to remove the polymerization solvent therefrom when these polymers are used as additives for plastics or in other uses. However, the methods for removing the solvents disclosed in these prior art are only those according to vacuum drying and reprecipitation purification The vacuum drying and reprecipitation purification are suitable for synthesis of a small amount of a specific polymer having limited composition and molecular weight, but are not industrially suitable for obtaining a series of quaternary ammonium group-containing polymers having different compositions, glass transition temperatures, molecular weights and the like.

Also, since quaternary ammonium group-containing polymers intermolecularly cause association of the quaternary ammonium groups bonded on the polymer side chain, the melt viscosity becomes high as compared with polymers that have the same composition but amino groups are not quaternized. Thus, the polymers may require to treat for a long time at high temperature. However, since the quaternary ammonium groups are generally poor in heat stability, operation under high temperature is easy to cause discoloration, decomposition or deterioration of the polymers.

On the other hand, a so-called reverse-phase suspension polymerization is known as a method for directly obtaining particles of quaternary ammonium group-containing polymers wherein an aqueous solution of monomers having a quaternary ammonium group is dispersed in a hydrophobic solvent and polymerized. The reverse-phase suspension polymerization method may be advantageous for the production of the quaternary ammonium group-containing polymers, since the polymers are obtained in the state of precipitates or dispersion and, therefore, the polymers can be separated from the polymerization mediums simply. However, in the reverse-phase suspension polymerization method, it is difficult to obtain copolymers of the quaternary ammonium group-containing monomers and hydrophobic monomers, because an aqueous solution of hydrophilic monomers is generally dispersed in a hydrophobic solvent and polymerized. Further, even in the case that no hydrophobic monomers can be copolymerized, the production method has another disadvantage that it is required to firstly subject a monomer to a quaternization reaction in a specific solvent, and then to prepare an aqueous solution of the obtained quaternized monomer.

Such copolymers containing the hydrophobic monomer are known to be obtained by a process wherein a copolymer having tertiary amino groups is firstly prepared by a solution polymerization or the like and then treated with a quaternizing agent. However, such a process has a fear of discoloration upon the removal of the solvent, as mentioned above, and is not always simple.

It is an object of the present invention to overcome the disadvantages of the prior art.

A further object of the present invention is to provide a process for producing polymers having quaternary ammonium groups according to which the polymers can be easily separated and taken out from a solvent used in the process without requiring a step such as heating.

A still further object of the present invention is to provide a process for producing the quaternary ammonium group-containing polymers which have a high content of a hydrophobic monomer in a simple manner.

Another object of the present invention is to provide a polymer having quaternary ammonium groups obtained by such a process according to the present invention.

These and other objects of the present invention will become apparent from the description hereinafter.

SUMMARY OF THE INVENTION

It has been found that if a vinyl monomer component containing a vinyl monomer having a tertiary amino group is polymerized in such a manner as conducting a polymerization reaction and a quaternization reaction simultaneously in the same system in a specific solvent, the resulting polymer having the quaternary ammonium group precipitates in the form of particles and can be easily separated as a powder. It has also been found that according to such a process, quaternary ammonium group-containing copolymers with hydrophobic vinyl monomers which are particularly difficult to prepare by other copolymerization methods, can be easily prepared in the form of particles and be separated as a powder.

In accordance with the present invention, there is provided a process for preparing a polymer having quaternary ammonium groups which comprises polymerizing a vinyl monomer component (A) containing a vinyl monomer having a tertiary amino group of the formula (1):

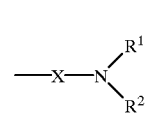
(1)

wherein X is —$(CH_2)_n$— in which n is an integer of 2 to 4, and $R^1$ and $R^2$ are independently an alkyl or hydroxyalkyl group having 1 to 9 carbon atoms, in a solvent (B) which can dissolve said vinyl monomer component (A) but cannot dissolve a resulting polymer having quaternary ammonium groups and which is inert to the polymerization, while quaternizing said tertiary amino group (1) with a quaternizing agent (C).

The present invention also provides a vinyl polymer having quaternary ammonium groups obtained by the process mentioned above.

DETAILED DESCRIPTION

The vinyl monomers having a tertiary amino group in the vinyl monomer component (A) used as a raw material in the process of the present invention are not particularly limited so long as they are vinyl monomers having a tertiary amino group represented by the formula (1).

Examples of such vinyl monomers having tertiary amino group are, for instance, dimethylaminoethyl (meth)acrylate, diethylaminoethyl (meth)acrylate, dimethylaminopropyl (meth)acrylate, dipropylaminoethyl (meth)acrylate, dibutylaminoethyl (meth)acrylate, dihydroxyaminoethyl (meth)acrylate, dimethylaminoethyl (meth)acrylamide, diethylaminoethyl (meth)acrylamide, dipropylaminoethyl (meth)acrylamide, and other amino group-containing alkyl (meth)acrylates and (meth)acrylamides. Dimethylaminoethyl methacrylate is particularly preferred among them. The terms "(meth)acrylate", "(meth)acrylamide" and the like as used herein means both acrylic compounds and methacrylic compounds.

The tertiary amino group (1) is converted, by treatment with quaternizing agent (C), into a quaternary ammonium group of the formula (2):

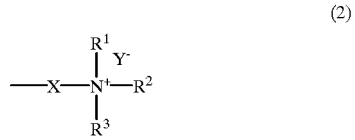

(2)

wherein X, $R^1$ and $R^2$ are as defined above, $R^3$ is hydrogen atom, an alkyl group having 1 to 9 carbon atoms or benzyl group which may be substituted by an alkyl group having 1 to 9 carbon atoms, and Y is a halogen atom, $R^4SO_3$ or $R^4OSO_3$ in which $R^4$ is an alkyl group having 1 to 20 carbon atoms or phenyl group which may be substituted by an alkyl group having 1 to 20 carbon atoms.

The vinyl monomer component (A) can contain other vinyl monomers copolymerizable with the above-mentioned vinyl monomer having a tertiary amino group and/or its quaternized product (other copolymerizable vinyl monomer being hereinafter referred to as "comonomer"). The quaternized product of the vinyl monomer having a tertiary amino group means a vinyl monomer having a quaternary ammonium group formed by quaternization of the vinyl monomer having a tertiary amino group with a quaternizing agent (C). The reason why the comonomer has been defined as those copolymerizable with the vinyl monomer having a tertiary amino group and/or its quaternized product is that the polymerization reaction and the quaternization reaction proceed in the same step and, therefore, when the polymerization reaction is on the way, it cannot be clearly determined whether the comonomer copolymerizes with the tertiary amino group-containing vinyl monomer or with its quaternized product. The comonomers can be suitably selected and used for the purpose of improving various physical properties of the obtained polymers having quaternary ammonium groups. Thus, the comonomers are not particularly limited so long as they are copolymerizable with the tertiary amino group-containing vinyl monomer or its quaternized product.

Examples of the comonomer are, for instance, an aromatic vinyl monomer such as styrene, α-methylstyrene or fluorostyrene; a vinyl cyanide such as (meth)acrylo-nitrile; a (meth)acrylic acid ester such as butyl (meth)acrylate or 2-hydroxyethyl (meth)acrylate; a (meth)acrylamide compound such as (meth)acrylamide, N-methyl(meth)acrylamide, N-ethyl(meth)acrylamide or N-hydroxymethyl (meth)acrylamide; a vinyl ester compound such as vinyl acetate or vinyl propionate; and the like. The comonomers may be used alone or in admixture thereof.

The comonomers may be hydrophilic vinyl monomers and hydrophobic vinyl monomers, and any of hydrophilic and hydrophobic vinyl monomers can be suitably introduced into the quaternary ammonium group-containing polymer. In particular, quaternary ammonium group-containing copolymers containing hydrophobic vinyl monomer units which were difficult in the prior art to obtain in the form of particles, can be easily prepared in the present invention. Examples of the hydrophobic vinyl monomers among the comonomers exemplified above are, for instance, a hydrophobic aromatic vinyl compound such as styrene, α-methylstyrene or fluorostyrene; a hydrophobic vinyl cyanide such as (meth)acrylonitrile; a (meth)acrylic acid ester, a vinyl ester compound, and the like. As the hydrophilic vinyl monomer are mentioned (meth)acrylamide compounds and the like.

The composition of the quaternary ammonium group-containing homo or copolymers obtained by the present invention is not particularly limited. The monomer ratio in the polymers can be arbitrarily determined in consideration of the properties required for the final uses of the polymers. For example, when the quaternary ammonium group-containing polymers are used as a permanent antistatic agent, the content of the quaternary ammonium group-containing monomer units in the polymers is preferably at least 5% by mole, more preferably at least 20% by mole.

According to the process of the present invention, the content of hydrophobic vinyl monomer units in the quaternary ammonium group-containing polymers can be raised to 20% by mole or more. From the viewpoint of the dispersion stability during the polymerization, the hydrophobic monomer content is preferably at least 30% by mole. Also, from the viewpoint of the yield of the copolymers obtained in the form of particles, the upper limit of the hydrophobic vinyl monomer content is preferably 95% mole or less, more preferably 80% by mole or less.

The vinyl monomer component (A) may contain polyfunctional vinyl monomers, i.e., a vinyl monomer having two or more addition polymerizable unsaturated groups, as a comonomer, as occasion demands, for instance, in the case that an improvement of the dispersion stability of a dispersion obtained by the process of the present invention is desired for the purpose of storage thereof for a long term, in the case that an improvement of the water resistance, durability or the like of films formed from the quaternary ammonium group-containing polymers obtained by the process of the present invention is desired, or in the case that it is desired to adjust the melt fluidity of the polymers. The reason why the dispersion stability of the obtained dispersion is improved by introduction of the polyfunctional vinyl monomer is considered to be that partial crosslinking or increase in molecular weight by formation of a high degree of branched structure occurs in the quaternary ammonium group-containing polymers, whereby swelling of the polymer particles with a polymerization solvent is restrained. The reason why the film performances are improved is considered to be that a crosslinked, weight-increased or highly branched polymer causes intertwinement in a higher degree than normal case in the drying step, as known in the case of general crosslinked polymer emulsions. When hydrophobic vinyl monomers are copolymerized with the quaternary ammonium group-containing monomers by other processes than the process of the invention, e.g., a solution polymerization as adopted in the prior art, such polyfunctional vinyl monomer must be used in a very small amount as low as less than about 0.1% by mole based on the whole vinyl monomer component (A), since it becomes a cause of gelation, viscosity increase, instabilization during the polymerization and the like. In contrast, in the present invention, the polyfunctional vinyl monomer can be used in a larger amount than 0.1% by mole. Preferably, the polyfunctional vinyl monomer is used in an amount of at most 5% by mole based on the whole vinyl monomer component (A), since if the amount exceeds 5% by mole, the resulting dispersion may become instable during the polymerization. Examples of the polyfunctional monomer are, for instance, divinyl benzene, ethylene glycol di(meth)acrylate, diethylene glycol di(meth)acrylate, methylenebis(meth)acrylamide, allyl (meth)acrylate, methallyl (meth)acrylate, trimethylolpropane tri(meth)acrylate, and other known polyfunctional vinyl monomers. The polyfunctional vinyl monomers may be used alone or in admixture thereof.

The solvent (B) used in the present invention is organic solvents which are capable of dissolving the vinyl monomer component (A) but incapable of dissolving the produced quaternary ammonium group-contianing polymers and which are inert to the polymerization Such solvents include, for instance, a saturated hydrocarbon solvent such as aliphatic hydrocarbon or an alicyclic hydrocarbon, an aromatic hydrocarbon solvent, a hydrophobic ketone solvent, an ester solvent, a nitrile solvent and the like. Examples of the solvent (B) are, for instance, a saturated hydrocarbon solvent such as n-hexane, n-heptane, n-octane, n-nonane, n-decane, undecane, n-dodecane, isooctane, 2,2,3-trimethylpentane, cyclohexane, methylcyclohexane or ethylcyclohexane; an aromatic hydrocarbon solvent such as ethylbenzene, tetralin, toluene or xylene; a hydrophobic ketone solvent such as methyl ethyl ketone, methyl isobutyl ketone, diisobutyl ketone, 2-hexanone, 2-heptanone, cyclohexanone or methylcyclohexanone; an ester solvent such as ethyl acetate, propyl acetate, isopropyl acetate, butyl acetate, isobutyl acetate, pentyl acetate, isopentyl acetate, 2-ethylbutyl acetate, cyclohexyl acetate, ethyl propionate, butyl propionate, diethyl carbonate or propylene carbonate; and a nitrile solvent such as acetonitrile or valeronitrile. Saturated hydrocarbon solvents and aromatic hydrocarbon solvents are preferred among them. The solvents may be used alone or in admixture thereof.

The solvent (B) may be used in combination with other solvents capable of dissolving a quaternary ammonium group-containing vinyl monomer obtained by quaternizing the tertiary amino group-containing vinyl monomer mentioned above, as occasion demands, in order to control the solubility of the vinyl monomer component (A), the rate of polymerization, and the molecular weight and particle size of the obtained quaternary ammonium group-containing polymer. Examples of such other solvents are, for instance, an alcohol solvent such as methanol, ethanol, 1-propanol, 2-propanol, 1-butanol, 2-butanol, isobutanol, 1-pentanol, isopentanol or 1-hexanol; an ether solvent such as ethyl cellosolve (2-hydroxyethyl ethyl ether), butyl cellosolve (2-hydroxyethyl butyl ether), ethyl carbitol (diethylene glycol monoethyl ether), butyl carbitol (diethylene glycol monobutyl ether) or diethylene glycol diethyl ether; and the like. These other solvents may be used alone or in admixture thereof. Preferably, the amount of the other solvents is usually not more than 30% by weight based on the whole solvent. If the amount of the other solvent is more than 30% by weight, the obtained dispersion of the polymer having the quaternary ammonium groups undesirably becomes unstable. The other solvents are desired to elect those miscible with the solvent (B) to form a uniform mixed solvent.

In the present invention, various known quaternizing agents can be used as the quaternizing agent (C). Examples of the quaternizing agent are, for instance, an alkyl sulfate such as dimethyl sulfate, diethyl sulfate or dipropyl sulfate, a sulfonic acid ester such as methyl p-toluenesulfonate or methyl benzenesulfonate, an alkyl chloride, an alkyl bromide, benzyl chloride, and the like. The alkyl sulfate and the alkyl sulfonic acid ester are particularly preferred as the quaternizing agent (C) from the viewpoint of the heat stability of the obtained quaternary ammonium group-containing polymers. The quaternizing agent (C) may be directly added to a reactor, if it is a liquid, to form a reaction system which contains the vinyl monomer component (A), the solvent (B) and the quaternizing agent (C), or may be added in the form of a solution in a solvent which may be any of solvents capable of dissolving the quaternizing agent (C), but are preferably those miscible with the solvent (B).

The term "reaction system" as used herein means a system comprising the vinyl monomer component (A), the solvent (B) and the quaternizing agent (C).

The process of the present invention is characterized by conducting a polymerization of the vinyl monomer component (A), while conducting a quaternization of the tertiary amino group of the tertiary amino group-containing vinyl monomer contained in the vinyl monomer component (A) by means of the quaternizing agent (C). The expression "conducting polymerization while conducting quaternization" or a similar expression as used herein means that in the reaction system as mentioned above, a quaternization reaction and a polymerization reaction are made to progress in the same step. Usually, a condition that the polymerization reaction has not been completed in the period for conducting the quaternization reaction is sufficient therefor. Such a reaction can be carried out in such a manner (1) that whole amounts of the vinyl monomer component (A) and the quaternizing agent (C) are added to a reactor at once to form the reaction system comprising the components (A), (B) and (C), and the quaternization reaction and the polymerization reaction then undergo in the same step, or (2) that the vinyl monomer component (A) and/or the quaternizing agent (C) are added to a reactor stepwise, intermittently or continuously so as to conduct the quaternization reaction and the polymerization reaction with forming the reaction system. The manner (2) is preferred, since the produced quaternary ammonium group-containing polymer is hard to coagulate and particle size can be controlled.

In the above manner (2), if a tertiary amino group-containing monomer in the vinyl monomer component (A) is previously added, it is preferable to stepwise or continuously add the quaternizing agent (C) to the monomer to form the reaction system. If the quaternizing agent (C) is previously added, it is preferable to stepwise or continuously add the tertiary amino group-containing monomer in the vinyl monomer component (A) to the quaternizing agent (C) to form the reaction system In more detail, the reaction system which comprises vinyl monomer component (A), solvent (B) and quaternizing agent (C), is formed in a manner such as (i) adding stepwise or continuously the quaternizing agent (C) to a system containing the vinyl monomer component (A) and the solvent (B), (ii) adding stepwise or continuously the vinyl monomer component (A) to a system containing the solvent (B) and the quaternizing agent (C), or (iii) adding stepwise or continuously the vinyl monomer component (A) and the quaternizing agent (C) to a system containing the solvent (B). In the above manners (ii) and (iii), a part or all of the comonomers may be previously added. A means for stepwise or continuously adding vinyl monomer component (A) and/or quaternizing agent (C) is not particularly limited and, for example, adoptable are a continuous dropwise addition and a stepwise addition herein the monomer component (A) and/or the quaternizing gent (C) is divided into plural portions and they are added stepwise.

In the above manner (2) wherein the reaction system is formed simultaneously with the progress of reactions by stepwise or continuously adding either one or both of the vinyl monomer component (A) and the quaternizing agent (C), a time for forming the reaction system is usually after reaching the predetermined polymerization conditions. That is to say, the addition is performed in the presence of a polymerization initiator after reaching a polymerization temperature. By the addition of the monomer component (A) and/or the quaternizing agent (C) under the polymerization conditions, the quaternization reaction and the polymerization reaction can be made to progress in the same step simultaneously with the addition. The polymerization initiator used in the present invention can be any of various known initiators without particular restrictions. Usually the polymerization initiator is previously added, or may be stepwise or continuously added in the form of a mixture with the quaternizing agent (c) or the vinyl monomer component (A). In the above-mentioned manner (1) wherein the reaction system is formed by adding the total amount of the components (A) and (C) prior to starting the quaternization reaction and the polymerization reaction, the reactions can be made to progress in the same step by conducting the reactions under the polymerization conditions after forming the reaction system. In case of the manner (1), a time for adding the polymerization initiator is not also limited, and the initiator may be added previously or after forming the reaction system.

In the preparation of the quaternary ammonium group-containing polymers, the polymerization reaction is carried out under the following coniditions. The polymerization temperature varies depending on the kind of the polymerization initiator, but is not particularly limited. Usually, the polymerization temperature is from 30 to 150° C. The polymerization time is usually from about 3 to about 15 hours. A quaternary ammonium group-containing polymer produced becomes insoluble in the polymerization solvent as the polymerization progresses and is deposited in the particle form. The concentration of the vinyl monomer component (A) is usually from about 1 to about 70% by weight, preferably about 20 to about 60% by weight. If the polymerization concentration exceeds 70% by weight, the state of dispersion is deteriorated and, therefore, the deposited polymer may be excessively agglomerated. The concentration of less than 1% by weight is disadvantageous in an industrial production.

In the present invention, a dispersion stabilizer (D) may be used as occasion demands. The dispersion stabilizer (D) serves to improve the dispersibility of the obtained polymer in the polymerization system. The dispersion stabilizer is suitably selected in accordance with the solvent and monomer used, the properties of the obtained polymer and the like. In particular, for the purpose of preventing agglomeration of the polymer particles, it is preferable to select a dispersion stabilizer having an affinity with and an adsorbing property to the polymer particles and having a high solubility in the solvent used A time for adding the dispersion stabilizer (D) is not particularly limited, but usually it is previously added with the solvent (B) prior to starting the polymerization.

Known dispersion stabilizers as generally used in the production of various non-aqueous polymer dispersions can be used in the present invention without particular restriction, so long as they satisfy the requirements as mentioned above Examples of the dispersion stabilizer (D) are, for instance, homopolymers of a vinyl monomer or copolymers of at least two vinyl monomers, e.g., an aromatic vinyl compound such as styrene, α-methylstyrene or fluorostyrene, a vinyl cyanide such as (meth)acrylonitrile, a (meth)acrylic acid ester such as butyl (meth)acrylate or 2-hydroxyethyl (meth)acrylate, a (meth)acrylic acid aminoalkyl ester such as N,N-dimethylaminoethyl (meth) acrylate, a (meth)acrylamide compound such as (meth) acrylamide, N-methyl(meth)acrylamide, N-ethyl(meth) acrylamide or N-hydroxymethyl(meth)acrylamide, and a vinyl ester such as vinyl acetate or vinyl propionate; homopolymers of a vinyl monomer having a cationic group such as a quaternary ammonium group and copolymers thereof with other vinyl monomers; cellulose compounds such as hydroxymethyl cellulose or hydroxypropyl cellulose; and macromonomers such as the above-mentioned homopolymers and copolymers which have a polymerizable group at the polymer chain end. The copolymer may be random copolymer, block copolymer or graft copolymer. Among these dispersion stabilizers, styrene-polymers (homopolymer of styrene, copolymers of styrene and various other vinyl monomers, and styrene macromonomers) are preferable. The styrene-macromonomers are particularly preferred from the viewpoints of low agglomerating property and high dispersing property. The styrene-macromonomers are styrene homopolymer and copolymers with other vinyl monomers to which a polymerizable group is introduced at the polymer chain end. Examples of the styrene-macromonomers are, for instance, a styrene homopolymer having a terminal polymerizable group (e.g., such a homopolymer commercially available under the trade mark "AS-6" from Toagosei Co., Ltd.), a styrene-(meth) acrylonitrile copolymer having a terminal polymerizable group (e.g., such a copolymer commercially available under the trade mark "AN-6" from Toagosei Co., Ltd.), and the like. The dispersion stabilizers may be used alone or in admixture thereof. Preferably, the dispersion stabilizer (D) is used in an amount of at most 15% by weight, especially at most 10% by weight, based on the vinyl monomer component (A). If the amount is more than 15% by weight, the properties of the desired quaternary ammonium group-containing polymers may be influenced by the stabilizers.

The polymer having quaternary ammonium groups obtained by the process of the present invention usually has a weight average molecular weight (Mw) of 10,000 to 5,000,000 and a number average molecular weight (Mn) of 5,000 to 2,000,000. The molecular weight of the quaternary ammonium group-containing polymer cannot be measured by gel permeation chromatography (GPC) under usual analytical conditions, since adsorption to column packing takes place. However, the average molecular weight can be measured, if the adsorption is restrained, for example, by use of an acetic acid buffer solution/acetonitrile mixed solvent as an eluant.

By the process mentioned above, the quaternary ammonium group-containing polymers of the present invention are obtained in the state of a dispersion wherein the precipitated polymer particles are dispersed in the polymerization solvent. The polymer particles may be in granular form wherein primary particles are secondarily agglomerated to some extent. The particle size of the obtained polymer particles (including the granular particles, hereinafter the same) is usually from 0.5 to 500 μm, especially not more than 100 μm. If a polyfunctional vinyl monomer is used as a comonomer, the particle size of the obtained polymer tends to decrease as compared with the polymer prepared under the same conditions excepting no use of the polyfunctional vinyl monomer, and is usually not more than 10 μm.

The polymer of the present invention can be obtained as a powder by separating the polymer particles from the polymerization solvent and drying them. The separation of the polymer particles from the solvent can be carried out by various known methods, such as centrifugation followed by removal of a supernatant (hereinafter referred to as centrifugation treatment) and filtration. The polymer particles separated from the solvent are then washed with an organic solvent such as solvent (B) and dried at a temperature which does not fuse together the particles and does not cause deterioration and discoloration of the polymer.

The melt viscosity of the quaternary ammonium group-containing polymer prepared by the process of the present invention is high as compared with that of a quaternary ammonium group-containing polymer having the same monomer composition and the same molecular weight prepared by a uniform solution polymerization method, though the range of viscosity difference cannot be absolutely determined because the melt viscosity greatly varies depending on monomer composition and molecular weight. A difference can be also seen in the solubility in a certain solvent between the both polymers. Thus, it is presumed that in the process for the production of the quaternary ammonium group-containing polymer of the present invention, a branched or graft-like structure is partially introduced to the polymer in the course of formation of particles. Further, in the case that a polyfunctional vinyl monomer has been used as a comonomer, it is found that the stability of the resulting dispersion is improved even in the stage that crosslinking has not occurred, the particle size of the obtained polymer is decreased and the melt viscosity is extremely increased. From these facts, it is presumed that in case of using a polyfunctional vinyl monomer, not only partial cross-linking or molecular weight increase takes place based on the polyfunctional monomer, but also branching or grafting as presumed to occur in the case of using no polyfunctional vinyl monomer becomes more easy to occur.

The present invention has the advantages that (1) polymers (homopolymers and copolymers) having quaternary ammonium groups can be easily obtained in the form of particles in a high yield, and a step for removing a solvent by heating as required in the prior art is not needed when taking out the deposited particles of the polymers, so quaternary ammonium group-containing polymers which are generally poor in heat resistance can be obtained as a powder without causing discoloration, deterioration and decomposition, (2) quaternary ammonium group-containing copolymers with a hydrophobic vinyl monomer which were difficult to obtain in the form of particles in the prior art can be easily obtained in the form of particles in a high yield, and similarly to the above, the copolymers can be obtained as a powder without causing discoloration and so on, (3) it is possible to obtain quaternary ammonium group-containing copolymers containing various vinyl monomers, irrespective of being hydrophilic or hydrophobic, in a high proportion, (4) since a quaternization reaction and a polymerization reaction are progressed in the same step, simplification of process steps, such as quaternization step and polymerization step which were separately conducted in the prior art, can be realized, and since a change of solvent between the quaternization step and the polymerization step is no longer needed, the production time can be greatly shortened, and (5) polyfunctional vinyl monomers can be used as a comonomer for the production of quaternary ammonium group-containing polymers without causing gelation of the polymers, whereby the dispersion stability of the resulting dispersion can be improved, the particle size of the polymers can be decreased, and when the resulting polymers are used, for example, as a coating material, improved properties such as water resistance and durability are obtained since a molecular weight-increased polymer is formed by partial crosslinking or formation of a highly branched structure.

The present invention is more specifically described and explained by means of the following Examples and Comparative Examples, wherein all percents are by weight unless otherwise noted. It is to be understood that the present invention is not limited to these Examples.

In the following Examples and Comparative Examples, the molecular weight was measured by GPC using a 1 M acetic acid buffer solution (pH 4.6)/acetonitrile mixed solvent as an eluant and was obtained as a polyethylene glycol reduced value.

EXAMPLE 1

A 500 ml reactor equipped with a stirrer, a thermometer, a reflux condenser, a nitrogen-introducing tube and a dropping funnel was charged with 45 g of styrene, 45.3 g of N,N-dimethylaminoethyl methacrylate, 197.3 g of cyclohexane, 6.9 g of a polystyrene (product of Nippon Steel Chemical Co., Ltd., trade mark "Estyrene GP-G32", weight average molecular weight 200,000) and 1.2 g of azobisisobutyronitrile, and the mixture was stirred for more than 30 minutes in a nitrogen atmosphere for dissolution. The resulting solution was then heated to 70° C. over 30 minutes with stirring, and with keeping that temperature, 46.6 g of diethyl sulfate was added dropwise to the reactor over 90 minutes. After the completion of the dropwise addition, the polymerization was subsequently carried out at that temperature for 5 hours to give a dispersion of polymer particles. The dispersion was filtered, washed with cyclohexane and dried under reduced pressure to give 127.9 g of a white polymer powder (yield 95%). The obtained polymer had a weight average molecular weight (Mw) of 237,000, a number average molecular weight (Mn) of 66,000 and an average particle size of 30 μm. The final polymerization conversion based on the whole monomers used was 96% by mole. The results are shown in Table 1.

EXAMPLE 2

A 500 ml reactor equipped with a stirrer, a thermometer, a reflux condenser, a nitrogen-introducing tube and a dropping funnel was charged with 45 g of styrene, 46.6 g of diethyl sulfate, 197.3 g of toluene, 6.9 g of a styrene macromonomer (product of Toagosei Co., Ltd., trade mark "AS-6", weight average molecular weight 6,000) and 1.2 g of azobisisobutyronitrile, and the mixture was stirred for more than 30 minutes in a nitrogen atmosphere for dissolution The resulting solution was then heated to 80° C. over 40 minutes with stirring, and with keeping that temperature, 45.3 g of N, N-dimethylaminoethyl methacryalte was added dropwise to the reactor over 90 minutes. After the completion of the dropwise addition, the polymerization was subsequently carried out at that temperature for 5 hours to give a dispersion of polymer particles. The dispersion was filtered, washed with toluene and dried under reduced pressure to give 137.4 g of a white polymer powder (yield 97%). The obtained polymer had a weight average molecular weight of 342,000, a number average molecular weight of 85,000 and an average particle size of 12 μm. The final polymerization conversion based on the whole monomers used was 98% by mole. The results are shown in Table 1.

EXAMPLES 3 to 15

The polymerization was carried out in the same manner as in Example 1 when a quaternizing agent was added dropwise, or in the same manner as in Example 2 when a vinyl monomer component was added dropwise, except that the composition of vinyl monomers, the quaternizing agent, the composition of solvent, the polymerization concentration, the polymerization temperature and the dispersion stabilizer were changed as shown in Table 1.

The results are shown in Table 1.

Comparative Example 1

A 500 ml reactor equipped with a stirrer, a thermometer, a reflux condenser, a nitrogen-introducing tube and a dropping funnel was charged with 50 g of styrene, 43.5 g of N,N-dimethylaminoethyl methacrylate, 31.6 g of xylene and 0.5 g of azobisisobutyronitrile, and the mixture was stirred for dissolution The resulting solution was then heated to 85° C. over 1 hour in a nitrogen stream, and with keeping that temperature, the polymerization was carried out for 2 hours. Further, a mixture of 50 g of styrene, 43.5 g of N, N-dimethylaminoethyl methacrylate, 31.6 g of xylene and 0.5 g of azobisisobutyronitrile was added dropwise to the reactor over 2 hours, and the polymerization was subsequently carried out for 3 hours to give a polymer having tertiary amino groups.

To the resulting polymer solution was then added 50 g of N,N-dimethylacetamide for dilution, and quaternization of the amino group in the polymer was carried out by adding dropwise 25 g of diethyl sulfate to the solution over 1 hour. The reaction mixture was then heated in order to remove the solvent, but the fluidity of the reaction mixture disappeared in the course of the removal, so the solvent could not be completely removed. Also, since it became impossible to conduct the stirring in the course of the removal of the solvent, partial discoloration of the polymer was observed due to occurrence of local heating in the vicinity of the reactor wall.

The results are shown in Table 2.

Comparative Example 2

A 500 ml reactor equipped with a stirrer, a thermometer, a reflux condenser, a nitrogen-introducing tube and a dropping funnel was charged with 45 g of styrene, 197.3 g of cyclohexane, 6.9 g of a polystyrene (product of Nippon Steel Chemical Co., Ltd., trade mark "Estyrene GP-G32", weight average molecular weight 200,000) and 1.2 g of azobisisobutyronitrile, and the mixture was stirred for more than 30 minutes in a nitrogen atmosphere. The resulting solution was then heated to 80° C. over 30 minutes with stirring, and with keeping that temperature, a mixture of 89.7 g of diethyl sulfate quaternary salt of N,N-dimethylaminoethyl methacrylate and 89.7 g of isopropyl alcohol was added dropwise to the reactor over 90 minutes. After the completion of the addition, the polymerization was carried out at that temperature for 5 hours. The obtained polymer particles were in a highly agglomerated state, and due to occurrence of adhesion to the reactor, subsequent filtration was difficult. After the filtration, the polymer was washed with cyclohexane and dried under reduced pressure to give 94.2 g of a white polymer solid (yield 70%). The analysis of the composition of the obtained polymer indicated that the content of styrene units was only 13% by mole, so it was found that the copolymerization scarcely proceeded.

The results are shown in Table 2.

Comparative Example 3

A 500 ml reactor equipped with a stirrer, a thermometer, a reflux condenser, a nitrogen-introducing tube and a dropping funnel was charged with 45 g of styrene, 197.3 g of cyclohexane, 6.9 g of diethyl sulfate quaternary salt of styrene-N,N-dimethylaminoethyl methacrylate copolymer (styrene/N,N-dimethylaminoethyl methacrylate ratio 90/10 by mole, product of Arakawa Chemical Industries, Ltd., trade mark "Lunapale 351") and 0.5 g of 2,2'-azobis(2-amidinopropane) hydrochloride, and the mixture was stirred for more than 30 minutes in a nitrogen atmosphere. The resulting solution was then heated to 50° C. over 30 minutes with stirring, and with keeping that temperature an aqueous solution of 89.7 g of diethyl sulfate quaternary salt of N, N-dimethylaminoethyl methacryalte dissolved in 89.7 g of water was added dropwise to the reactor over 90 minutes. After the completion of the addition, the polymerization was further carried out at that temperature for 5 hours. The obtained polymer particles were filtered off, washed with cyclohexane and dried under reduced pressure to give 92.7 g of a white polymer powder (yield 65%). The analysis of the composition of the obtained polymer indicated that the content of styrene units was only 7% by mole, so it was found that the copolymerization scarcely proceeded.

The results are shown in Table 2.

Comparative Example 4

A 500 ml reactor equipped with a stirrer, a thermometer, a reflux condenser, a nitrogen-introducing tube and a dropping funnel was charged with 45 g of styrene, 89.7 g of diethyl sulfate quaternary salt of N,N-dimethylaminoethyl methacrylate and 197.3 g of acetonitrile, and the mixture was heated to 50° C. over 30 minutes with stirring for dissolution. After stirring the resulting solution for more than 30 minutes in a nitrogen atmosphere, 10 g of a 1% aqueous solution of ammonium persulfate was added to the reactor, and the polymerization was carried out at 50° C. for 5 hours. It was observed that a fair amount of the produced polymer particles adhered to the reactor, and the filtration of the obtained dispersion was not easy. After the filtration of the dispersion, the polymer was washed with acetonitrile and dried under reduced pressure to give 90.3 g of a white polymer solid (yield 67.0%). The analysis of the composition of the obtained polymer indicated that the content of styrene units was only 6% by mole, so it was found that the copolymerization scarcely proceeded.

The results are shown in Table 2.

EXAMPLE 16

In this Example, a polyfunctional vinyl monomer was used.

A 500 ml reactor equipped with a stirrer, a thermometer, a reflux condenser, a nitrogen-introducing tube and a dropping funnel was charged with 60.0 g of styrene, 62.2 g of diethyl sulfate, 277.4 g of toluene and 0.8 g of azobisisobutyronitrile, and the mixture was stirred for more than 30 minutes in a nitrogen atmosphere for dissolution. The resulting solution was then heated to 80° C. over 30 minutes with stirring, and with keeping that temperature, 60.4 g of N,N-dimethylaminoethyl methacrylate and 2.3 g of 55% divinyl benzene were added dropwise to the reactor over 240 minutes. After the completion of the addition, the polymerization was subsequently carried out at that temperature for 2 hours to give a dispersion of polymer particles. The dispersion was subjected to a centrifugation treatment, washed and dried under reduced pressure to give 170.6 g of a white polymer powder (yield 95%). The final conversion based on the whole monomers was 99% by mole, and the average particle size of the obtained polymer was 3 μm The molecular weight of the polymer was not measured, since it was insoluble in water.

The results are shown in Table 1.

EXAMPLE 17

In this Example, a polyfunctional vinyl monomer was used.

A 500 ml reactor equipped with a stirrer, a thermometer, a reflux condenser, a nitrogen-introducing tube and a dropping funnel was charged with 11.1 g of a styrene macromonomer (product of Toagosei Co., Ltd., trade mark "AS-6", weight average molecular weight 6,000), 45.0 g of styrene, 70.0 g of diethyl sulfate, 222.7 g of toluene and 2.9 g of azobisisobutyronitrile, and the mixture was stirred for more than 30 minutes in a nitrogen atmosphere for dissolution. The resulting solution was then heated to 90° C. over 30 minutes with stirring, and with keeping that temperature a monomer mixture of 80.1 g of N,N-diethylaminoethyl methacrylate, 27.6 g of n-butyl acrylate and 2.1 g of ethylene glycol dimethacrylate was added dropwise to the reactor over 240 minutes. After the completion of the addition, the polymerization was subsequently carried out at that temperature for 2 hours to give a dispersion of polymer particles. The dispersion was subjected to a centrifugation treatment, washed and dried under reduced pressure to give 205.2 g of a white polymer powder (yield 93%). The final conversion based on the whole monomers was 97% by mole, and the average particle size of the obtained polymer was 3 $\mu$m. The molecular weight of the polymer was not measured, since it was insoluble in water.

The results are shown in Table 1.

Comparative Example 5

A 500 ml reactor equipped with a stirrer, a thermometer, a reflux condenser, a nitrogen-introducing tube and a dropping funnel was charged with 60.0 g of styrene, 220.5 g of toluene and 1.6 g of azobisisobutyro-nitrile, and the mixture was stirred for more than 30 minutes in a nitrogen atmosphere for dissolution. The resulting solution was then heated to 80° C. over 30 minutes with stirring, and with keeping that temperature a solution of 60.4 g of N,N-dimethylaminoethyl methacrylate and 2.3 g of 55% divinyl benzene in 60.4 g of toluene was added dropwise to the reactor. In the course of the dropwise addition, the viscosity of the solution gradually increased, and finally the stirring became impossible due to gelation. The results are shown in Table 2.

The properties of the dispersions and the polymers obtained in Examples 2, 14, 16 and 17 were measured by the following methods. The results are shown in Table 3.

(Dispersion stability)

A dispersion was placed in a closed container and allowed to stand in a thermostat kept at 40° C. The concentration of the dispersion was measured after a predetermined time elapsed.

(Water resistance of dried coating film)

A dispersion was coated on a glass plate by a bar coater in an amount of 20 g/m² on dry basis, and dried 30 at 130° C. for 1 hour. The surface of the dried film was rubbed with a gauze impregnated with water, and the surface state was visually observed to evaluate the water resistance of the coating film according to the following criteria.

◯: No change

Δ: Dulling (getting a scratch or losing a gloss due to delicate dissolution of the surface)

x: Partial dissolution (Solvent resistance of dried coating film)

A dispersion was coated on a glass plate by a bar coater in an amount of 20 g/m² on dry basis, and dried at 130° C. for 1 hour. The surface of the dried film was rubbed with a gauze impregnated with a mixed solvent of 50% of tetrahydrofuran and 50% of methanol, and the surface state was visually observed to evaluate the solvent resistance of the coating film according to the following criteria.

◯: No change

Δ: Dulling (getting a scratch or losing a gloss due to delicate dissolution of the surface)

x: Partial dissolution (Pencil hardness of dried coating film)

A dispersion was coated on a glass plate by a bar coater in an amount of 20 g/m² on dry basis, and dried at 130° C. for 1 hour. The pencil hardness of the dried film was measured according to JIS K 5400.

TABLE 1

| | Composition of vinyl monomer (A) | | | | Quaternizing agent (C) | Component added dropwise | Composition of solvent (B) | | | Polymerization concentration (%) | Polymerization temperature (° C.) | Dispersion stabilizer (D) | |
|---|---|---|---|---|---|---|---|---|---|---|---|---|---|
| | (1) | (2) | (3) | (1)/(2)/(3) (% by mole) | | | P | Q | P/Q (%) | | | Kind | Amount based on (A) (%) |
| Ex.1 | St | DM | — | 60/40/0 | DES | (C) | CH | — | 100/0 | 40 | 70 | PSt | 5 |
| Ex.2 | St | DM | — | 60/40/0 | DES | (A)(2) | Tol | — | 100/0 | 40 | 80 | AS-6 | 5 |
| Ex.3 | St | DM | — | 50/50/0 | DES | (C) | Tol | — | 100/0 | 40 | 80 | PSDDES | 5 |
| Ex.4 | St | DM | — | 80/20/0 | DMS/IPA | (C) | CH | Hex | 70/30 | 30 | 70 | AS-6 | 10 |
| Ex.5 | St | DM | — | 40/60/0 | DES | (C) | CH | Hex | 70/30 | 30 | 70 | PSDDES | 5 |
| Ex.6 | — | DM | — | 0/100/0 | DES | (C) | CH | — | 100/0 | 30 | 70 | AS-6 | 5 |
| Ex.7 | St | DM | — | 40/6010 | DES | (C) | CH | — | 100/0 | 40 | 70 | — | 0 |
| Ex.8 | St | DM | — | 40/60/0 | DES | (A)(2) | Tol | — | 100/0 | 50 | 80 | — | 0 |
| Ex.9 | — | DE | — | 40/60/0 | PTSME/IPA | (C) | CH | — | 100/0 | 30 | 70 | AS-6 | 10 |
| Ex.10 | St | DE | — | 60/40/0 | DES/IPA | (C) | Oct | — | 100/0 | 30 | 80 | PSt | 10 |
| Ex.11 | α St | DM | — | 40/60/0 | DES | (C) | CH | — | 100/0 | 40 | 70 | AS-6 | 10 |
| Ex.12 | — | DM | BA | 0/60/40 | DMS/IPA | (A)(2) | Tol | CH | 90/10 | 40 | 75 | AS-6 | 5 |
| Ex.13 | St | DE | MMA | 40/40/20 | DES/IPA | (C) | CH | — | 100/0 | 40 | 70 | PSt | 5 |
| Ex.14 | St | DE | BA | 40/40/20 | DES/IPA | (A)(2) | Tol | CH | 95/5 | 50 | 75 | PSt | 5 |
| Ex.15 | — | DE | AM | 0/40/60 | DMS/IPA | (C) | CH | — | 100/0 | 30 | 70 | PSDDES | 5 |
| Ex.16 | St | DM | — | 60/40/0 | DES | (A)(2) | Tol | — | 100/0 | 40 | 80 | — | 0 |
| Ex.17 | St | DE | BA | 40/40/20 | DES | (A)(2)(3) | Tol | — | 100/0 | 50 | 90 | AS-6 | 5 |

TABLE 1-continued

| | Yield (%) | Mw × 10⁴ | Mn × 10⁴ | Composition of product (% by weight) | | | Conversion (% by mole) | Average particle size (μm) |
|---|---|---|---|---|---|---|---|---|
| | | | | (1) | (2) | (3) | | |
| Ex.1 | 95 | 23.7 | 6.6 | 58.5 | 41.5 | — | 96 | 30 |
| Ex.2 | 97 | 34.2 | 8.5 | 59.5 | 40.5 | — | 98 | 12 |
| Ex.3 | 96 | 30.5 | 7.9 | 49.0 | 51.0 | — | 97 | 27 |
| Ex.4 | 96 | 27.6 | 7.8 | 79.0 | 21.0 | — | 97 | 32 |
| Ex.5 | 96 | 25.6 | 7.2 | 39.5 | 60.5 | — | 97 | 31 |
| Ex.6 | 98 | 35.2 | 8.5 | — | 99.0 | — | 99 | 36 |
| Ex.7 | 95 | 24.8 | 6.8 | 39.0 | 61.0 | — | 96 | 28 |
| Ex.8 | 96 | 32.1 | 7.9 | 39.0 | 61.0 | — | 97 | 23 |
| Ex.9 | 95 | 27.3 | 7.5 | 39.0 | 61.0 | — | 96 | 65 |
| Ex.10 | 97 | 20.8 | 7.2 | 58.5 | 41.5 | — | 97 | 58 |
| Ex.11 | 96 | 28.5 | 6.8 | 38.5 | 61.5 | — | 97 | 36 |
| Ex.12 | 96 | 36.5 | 8.1 | — | 61.5 | 38.5 | 97 | 42 |
| Ex.13 | 95 | 22.9 | 6.8 | 39.5 | 40.7 | 19.8 | 96 | 55 |
| Ex.14 | 95 | 31.5 | 8.2 | 39.3 | 41.4 | 19.3 | 96 | 46 |
| Ex.15 | 94 | 33.1 | 8.3 | — | 41.0 | 59.0 | 95 | 51 |
| Ex.16 | 95 | measurement impossible | | 59.2 | 40.8 | — | 99 | 3 |
| Ex.17 | 93 | measurement impossible | | 39.5 | 40.9 | 19.6 | 97 | 3 |

The abbreviations in Table 1 denote the following compounds.

St: styrene
αSt: α-methylstyrene
DM: N,N-dimethylaminoethyl methacrylate
DE: N,N-diethylaminoethyl methacrylate
BA: butyl acrylate
MMA: methyl methacrylate
AM: acrylamide
DES: diethyl sulfate
DMS/IPA: dimethyl sulfate dissolved in isopropyl alcohol
PTSME/IPA: methyl p-toluenesulfonate dissolved in isopropyl alcohol
DES/IPA: diethyl sulfate dissolved in isopropyl alcohol
CH: cyclohexane
Hex: n-hexane
Oct: n-octane
Tol: toluene
PSt: polystyrene
AS-6: styrene macromonomer (made by Toagosei Co., Ltd.)
PSDDES: LUNAPALE 351 (diethyl sulfate quaternary salt of a copolymer of styrene and N,N-dimethylaminoethyl methacrylate in a molar ratio of 90/10 made by Arakawa Chemical Industries, Ltd)

The polymer particles filtered off was washed by using n-hexane in Examples 4 and 5, toluene in Examples 12 and 14, and the same solvent as the polymerization solvent in the other Examples.

The vinyl monomer component (A) of Example 16 shown in Table 1 contains 1% by mole of divinyl benzene based on the vinyl monomer component (A) excepting divinyl benzene. Also, the vinyl monomer component (A) of Example 17 shown in Table 1 contains 1% by mole of ethylene glycol dimethacrylate based on the vinyl monomer component (A) excepting ethylene glycol dimethacrylate.

TABLE 2

| | Composition of vinyl monomer | | | Quaternizing agent added dropwise | Solvent | Yield (%) | Composition of product (1)/(2) (% by mole) |
|---|---|---|---|---|---|---|---|
| | (1) | (2) | (1)/(2) (% by mole) | | | | |
| Com.Ex.1 | St | DM | 63/37*¹ | DES | xylene | *³ | — |
| Com.Ex.2 | St | DM.DES | 60/40 | — | CH/IPA | 70 | 13/87 |
| Com.Ex.3 | St | DM.DES | 60/40 | — | CH/water | 65 | 7/93 |
| Com.Ex.4 | St | DM.DES | 60/40 | — | CH₃CN | 67 | 6/94 |
| Com.Ex.5*² | St | DM | 60/40 | — | toluene | *³ | — |

(Notes) St: styrene
DM: N,N-dimethylaminoethyl methacrylate
DM.DES: diethyl sulfate quaternary salt of N,N-dimethylaminoethyl methacrylate
DES: diethyl sulfate
CH: cyclohexane
IPA: isopropyl alcohol
*¹Molar % of (2) in Com. Ex.1 denotes total molar % of DM and diethyl sulfate.
*²In Com. Ex.5, divinyl benzene was used in an amount of 1% by mole based on the whole vinyl monomer component excepting divinyl benzene
*³Withdrawal was impossible.

TABLE 3

|  | Dispersion stability (change in concentration) (%) | | | Water resistance | Solvent resistance | Pencil hardness |
| --- | --- | --- | --- | --- | --- | --- |
|  | Initial | After 1 week | After 3 weeks | | | |
| Ex.2 | 38.4 | 36.7 | 31.9 | Δ~X | X | 3B |
| Ex.16 | 39.6 | 39.5 | 39.4 | ◯ | ◯ | H |
| Ex.14 | 48.0 | 41.8 | 36.9 | X | X | 5B |
| Ex.17 | 48.5 | 48.3 | 48.3 | ◯ | ◯ | HB |

In Table 4, Examples 16 and 17 show embodiments using a vinyl monomer or monomers in combination with a polyfunctional vinyl monomer. It is observed that the polymer obtained in Example 16 is improved in film properties as compared with that of Example 2, and the polymer obtained in Example 17 is improved in film properties as compared with that of Example 14.

In the production of quaternary ammonium group-containing polymers, a solution polymerization method would be applicable to copolymerization of a hydrophobic vinyl monomer with other vinyl monomer, as known in the prior art. In Comparative Example 1, a copolymer prepared by a solution polymerization method was quaternized, but the obtained quaternary ammonium group-containing polymer could not be effectively separated from a polymerization solvent. In Comparative Examples 2 to 4, a dispersion polymerization or suspension polymerization was attempted by using a vinyl monomer having a quaternary ammonium group separately prepared by quaternizing a vinyl monomer having a tertiary amino group, but a hydrophobic vinyl monomer could be scarcely copolymerized with the quaternized monomer. In Comparative Example 5, a polyfunctional vinyl monomer was used with other vinyl monomers, but gelation occurred in the course of production of a copolymer having tertiary amino groups by a solution polymerization The situation that a copolymerization is impossible is the same as above, even if a polyfunctional monomer is used in a solution polymerization of a previously quaternized monomer.

In addition to the ingredients used in the Examples, other ingredients can be used in the Examples as set forth in the specification to obtain substantially the same results.

What we claim is:

1. A process for preparing a polymer having quaternary ammonium groups which comprises polymerizing a vinyl monomer component (A) containing a vinyl monomer having a tertiary amino group of the formula (1):

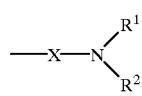

(1)

wherein X is —(CH$_2$)$_n$— in which n is an integer of 2 to 4, and R$^1$ and R$^2$ are independently an alkyl or hydroxyalkyl group having 1 to 9 carbon atoms, in a solvent (B) which dissolves said vinyl monomer component (A) but cannot dissolve a resulting polymer having quaternary ammonium groups and which is inert to the polymerization, while quaternizing said tertiary amino group (1) with a quaternizing agent (C).

2. The process of claim 1, wherein at least one of said vinyl monomer component (A) and said quaternizing agent (C) is added stepwise or continuously to a reactor to form a reaction system comprising said vinyl monomer component (A), said solvent (B) and said quaternizing agent (C), whereby the quaternization reaction and the polymerization reaction proceed while forming said reaction system.

3. The process of claim 2, wherein said reaction system is formed by stepwise or continuously adding said quaternizing agent (C) to a system previously containing said vinyl monomer component (A) and said solvent (B).

4. The process of claim 2, wherein said reaction system is formed by stepwise or continuously adding said vinyl monomer component (A) to a system previously containing said solvent (B) and said quaternizing agent (C).

5. The process of claim 1, wherein said vinyl monomer component (A) contains other vinyl monomer than said vinyl monomer having a tertiary amino group (1) and its quaternization product, said other vinyl monomer being copolymerizable with at least either one of said vinyl monomer having a tertiary amino group (1) and its quaternization product.

6. The process of claim 5, wherein said other vinyl monomer copolymerizable with at least either one of said vinyl monomer having a tertiary amino group (1) and its quaternization product contains a hydrophobic vinyl monomer.

7. The process of claim 6, wherein the content of said hydrophobic vinyl monomer in the polymer having quaternary ammonium groups is from 20 to 95% by mole.

8. The process of claim 5, wherein said other vinyl monomer copolymerizable with at least either one of said vinyl monomer having a tertiary amino group (1) and its quaternization product contains a polyfunctional vinyl monomer.

9. The process of claim 1, wherein said solvent (B) contains at least one of a saturated hydrocarbon solvent and an aromatic hydrocarbon solvent.

10. The process of claim 1, wherein said polymerizing is carried out in the presence of a dispersion stabilizer (D).

11. The process of claim 10, wherein said dispersion stabilizer (D) contains a styrene-based polymer.

12. The process of claim 10, wherein said dispersion stabilizer (D) contains a styrene-based macromonomer.

13. The process of claim 1, wherein said polymer having quaternary ammonium groups has a weight average molecular weight of 10,000 to 5,000,000.

14. The process of claim 1, wherein said polymer having quaternary ammonium groups has a number average molecular weight of 5,000 to 2,000,000.

15. The process of claim 1, wherein said polymer having quaternary ammonium groups is produced in the form of particles.

16. The process of claim 15, wherein the size of said particles of polymer having quaternary ammonium groups is within the range of 0.5 to 500 μm.

17. A polymer having quaternary ammonium groups produced by the process of claim 1.

* * * * *